(12) United States Patent
Zolotov et al.

(10) Patent No.: US 10,424,924 B2
(45) Date of Patent: Sep. 24, 2019

(54) UTILITY GRID GENERATOR CONNECTION

(71) Applicant: Consolidated Edison Company of New York, Inc., New York, NY (US)

(72) Inventors: Kirill Zolotov, New York, NY (US); Baeth Fanek, Yorktown Heights, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 314 days.

(21) Appl. No.: 15/598,448

(22) Filed: May 18, 2017

(65) Prior Publication Data

US 2017/0338655 A1 Nov. 23, 2017

Related U.S. Application Data

(60) Provisional application No. 62/338,635, filed on May 19, 2016.

(51) Int. Cl.
*H02J 3/00* (2006.01)
*H01R 11/32* (2006.01)
*H01R 31/02* (2006.01)
*H01R 13/523* (2006.01)
*H02J 11/00* (2006.01)

(52) U.S. Cl.
CPC .............. *H02J 3/00* (2013.01); *H01R 11/32* (2013.01); *H01R 31/02* (2013.01); *H01R 13/523* (2013.01); *H02J 11/00* (2013.01)

(58) Field of Classification Search
CPC ...................................... H02J 3/38; H02J 9/00
See application file for complete search history.

(56) References Cited

U.S. PATENT DOCUMENTS

| | | | |
|---|---|---|---|
| 6,381,155 B1 * | 4/2002 | Kadatsky | H02M 1/34 363/65 |
| 6,679,728 B1 * | 1/2004 | Huang | H01R 24/545 200/51.09 |
| 7,259,481 B2 * | 8/2007 | Eaton | H02J 9/06 307/125 |
| 8,152,542 B2 | 4/2012 | Kucera et al. | |
| 8,174,149 B2 * | 5/2012 | Chapel | H01R 13/6683 307/64 |
| 8,288,890 B2 | 10/2012 | Young | |
| 8,292,658 B2 | 10/2012 | Sullivan et al. | |
| 9,281,716 B2 * | 3/2016 | Albsmeier | H02J 9/06 |
| 2009/0249960 A1 * | 10/2009 | Lassota | A47J 31/58 99/288 |

(Continued)

*Primary Examiner* — Daniel Kessie
(74) *Attorney, Agent, or Firm* — Cantor Colburn LLP

(57) ABSTRACT

An auxiliary generator connection, a method of operating and a system are disclosed. The auxiliary generator connection includes at least one first conductor coupled to a first portion of the electrical utility distribution network. At least one second conductor is coupled to a second portion of the electrical utility distribution network. A t-type connector is coupled between the at least one first conductor and the at least one second conductor. A switch is coupled between the at least one second conductor and the t-type connector. A generator conductor is electrically coupled at a first end to the t-type connector. A generator plug is coupled to a second end of the generator conductor opposite the t-type connector.

20 Claims, 5 Drawing Sheets

(56) References Cited

U.S. PATENT DOCUMENTS

| | | | |
|---|---|---|---|
| 2010/0210126 A1 | 8/2010 | Everett | |
| 2014/0218010 A1* | 8/2014 | Fulton | H01R 33/90 |
| | | | 324/110 |
| 2014/0352998 A1 | 12/2014 | Thoerner | |
| 2015/0035358 A1* | 2/2015 | Linkhart | H02J 3/006 |
| | | | 307/23 |
| 2016/0094152 A1* | 3/2016 | Geil | H02J 3/14 |
| | | | 363/123 |
| 2016/0181767 A1* | 6/2016 | Stone | H02B 1/06 |
| | | | 340/662 |
| 2016/0195435 A1* | 7/2016 | Krueger | H01R 13/6683 |
| | | | 374/184 |

* cited by examiner

UTILITY GRID GENERATOR CONNECTION

CROSS REFERENCE TO RELATED APPLICATIONS

This application claims the benefit of U.S. Provisional Application Ser. No. 62/338,635, filed May 19, 2016, the entire disclosure of which is incorporated herein by reference.

BACKGROUND

The subject matter disclosed herein relates to an electrical generator connection and in particular to an electrical generator connection for underground utility distribution networks and distribution substations.

Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

In some instances, electrical utilities may be financially penalized in the event that certain metrics or conditions are not satisfied. For example, an electrical utility may be fined if a certain percentage of the customers connected to the electrical utility network customers are without electrical power. To maintain electrical network performance metrics at desired levels, the electrical utility may utilize auxiliary generators to supply electrical power to customers that downstream from an event that has interrupted the electrical power delivery service. They even may include a service interruptions due to equipment damage (e.g. a utility pole knocked down, or contractor damage to an underground line) and/or excessive electrical demand on the network (e.g. days with high temperatures and large air conditioning loads). Since an auxiliary generator cannot be allowed to flow electrical power into the general electrical grid, the portion of the network powered by the auxiliary generator needs to be electrically isolated. In some instances, customers are connected to a section of the grid that is easily isolated, such as customers connected to a 4 kV grid for example since this type of network may be easily isolated and an auxiliary generator connected. However, most customers are connected to a secondary distribution network to which connecting auxiliary generators is difficult. The only means is to isolate the customer's cable from the grid by entering the manhole and connecting the generator leads to a single customer supplied by the service cable. Other nearby customers that may be out of lights will each require their own individual generator connection to their supply or service cable.

To connect an auxiliary generator to a secondary distribution network, utility personnel enter a distribution manhole and cut the secondary cable or low voltage cables. A standard generator connector is then manually coupled to the cut end of the secondary cable. The auxiliary generator is connected to the isolated distribution customers and operations initiated to supply electrical power to the distribution customer(s). It should be appreciated that this operation may have to occur during less than desirable conditions (e.g. a heat wave) when the electrical cables being cut are heavily loaded. To return the secondary distribution network, the operation of the auxiliary generator is halted and disconnected from the secondary cable. The secondary cables must then be re-spliced back together to restore electrical service. Sometimes, this causes the crews to re-splice all the secondary (or 120V) cables in the manhole.

While existing methods of connecting auxiliary electrical generators to electrical utility distribution networks are suitable for their intended purposes the need for improvement remains, particularly in providing a system for quickly and easily isolating a portion of an electrical network and connecting an auxiliary electrical generator.

BRIEF DESCRIPTION

According to one aspect of the disclosure, an auxiliary generator connection for an electrical utility distribution network is provided. The connection includes at least one first conductor coupled to a first portion of the electrical utility distribution network. At least one second conductor is coupled to a second portion of the electrical utility distribution network. A t-type connector is coupled between the at least one first conductor and the at least one second conductor. A switch is coupled between the at least one second conductor and the t-type connector. A generator conductor is electrically coupled at a first end to the t-type connector. A generator plug is coupled to a second end of the generator conductor opposite the t-type connector.

According to another aspect of the disclosure a method of connecting an auxiliary electrical generator to an electrical utility distribution network is provided. The method includes providing a t-type connection between a first conductor coupled to a first portion of the electrical utility distribution network and a second conductor coupled to a second portion of the electrical utility distribution network. A generator cable is provided that is coupled on a first end to the t-type connector and generator plug on a second opposing end of the generator cable. A switch is provided between the t-type connector and the second conductor. The switch is actuated to isolate the first portion of the electrical utility distribution network from the second portion of the electrical utility distribution network. The generator plug is coupled to an auxiliary electrical generator. Electrical power is generated with the auxiliary electrical generator.

According to yet another aspect of the disclosure a system for connecting an auxiliary electrical generator to an electrical utility distribution network is provided. The system includes a crab joint configured to electrically couple to a first portion of the electrical utility distribution network. A t-type connector is electrically coupled to the crab joint, the t-type connector being configured to operate at 30 kV, 600 amp continuous rating with a 50 KA peak short circuit rating. A switch is electrically coupled to the t-type connector opposite the crab joint, the switch configured to electrically couple to a second portion of the electrical utility distribution network. A generator cable is electrically coupled on a first end to the t-type connector. A generator plug is coupled to a second end of the t-type connector.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present invention provide for a system and method of quickly and easily connecting an auxiliary electrical generator to a secondary distribution network and isolating the network from the upstream portion of the utility network without requiring utility personnel to slice conductors to form the connection.

A typical utility electrical distribution system includes one or more power plants connected in parallel to a main transmission system. The power plants may include, but are not limited to: coal, nuclear, natural gas, or incineration power plants for example. Additionally, the power plant may include one or more hydroelectric, solar, or wind turbine power plants for example. It should be appreciated that additional components such as transformers, switchgear, fuses and the like may be incorporated into the utility system as needed to ensure the safe and efficient operation of the system. The utility system is typically interconnected with one or more other utility networks to allow the transfer of electrical power into or out of the electrical system 20.

The main transmission system typically consists of high transmission voltage power lines, anywhere from 69 KV to 500 KV for example, and associated transmission and distribution equipment which carry the electrical power from the point of production at the power plant to the end users located on local or secondary distribution networks. In an exemplary embodiment, the secondary distribution network is an underground low voltage network. The secondary distribution systems are connected to the main distribution system by area substations which reduce transmission voltage to distribution levels such as 13 KV, 27 KV or 33 KV. Area Substations typically contain one or more transformers, switching, protection, and control equipment. Area Substations include circuit breakers to interrupt faults such as short circuits. Substations may also include equipment such as fuses, surge protection, controls, meters, capacitors, and load tap changers for voltage regulation.

Figure 1:
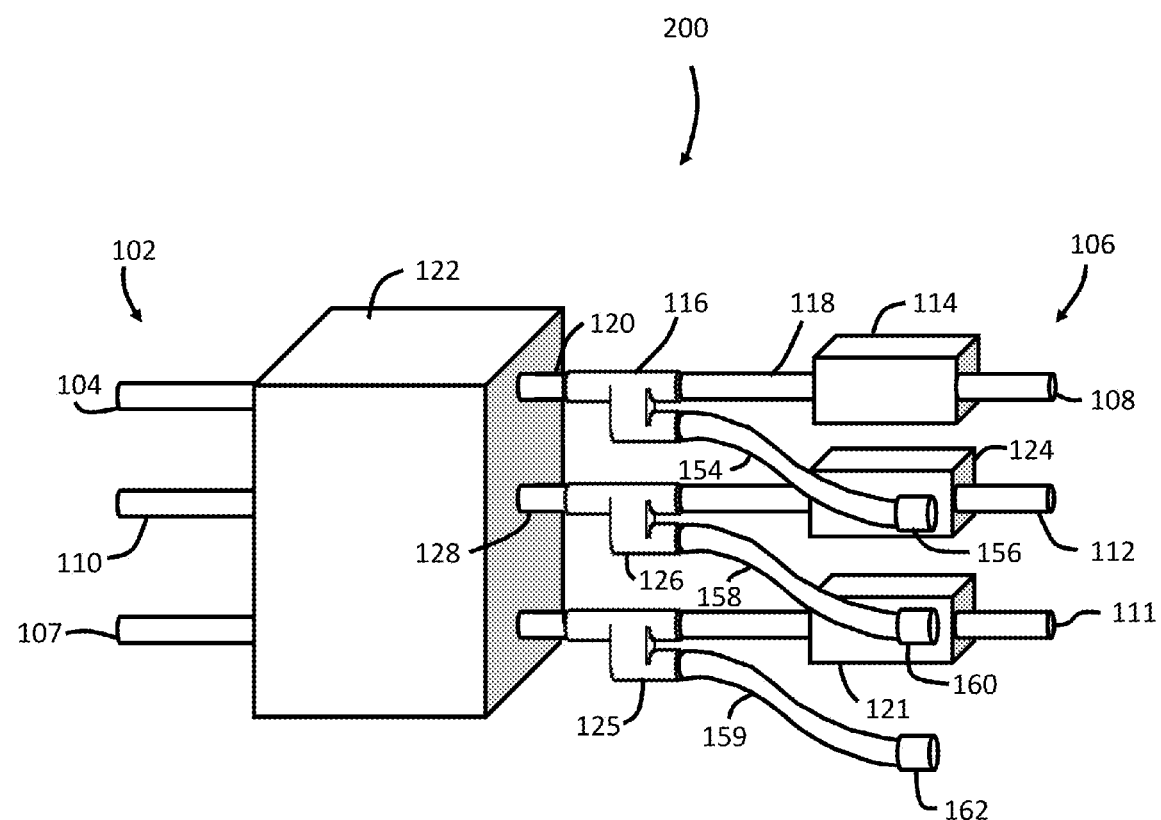
FIG. 1 is perspective view of an auxiliary generator connection in accordance with an embodiment of the invention.

It should be appreciated that in some instances, it may be desirable to provide power to a distribution system or a portion of a distribution system from an auxiliary power source, such as a mobile electrical generator for example. The auxiliary power source may be used to reduce the electrical demand on an area substation or the main transmission line for example. Such as time periods of peak energy usage. Referring now to FIG. 1, an embodiment of a generator connection system 100 is shown that allows utility personnel to quickly connect an auxiliary power source to the distribution system and isolate the distribution system from the rest of the electrical utility network. The system 100 is typically located in a subterranean location and accessed by utility personnel via a manhole.

In the exemplary embodiment, the system 100 is connected to a low voltage distribution network, on which the customers are served from a three-phase, circuit. The system 100 may be connected to three input conductors 108, 111, 112 that are connected to receive electrical power from the utility network. The system may further be connected to three output conductors 104, 107, 110 that are connected to the electrical loads (e.g. utility customers). Thus the system 100 is disposed between a first portion 102 of a secondary distribution network and a second portion 106 of the secondary distribution network. The system 100 includes a switch 114 disposed between the conductor 108 and a t-type connector 116. The switch 114 is configured to be actuated between a closed position and an open position. When in the open position, the switch 114 electrically isolates the input conductors 108, 111, 112 from the output conductors 104, 107, 110. As will be discussed in more detail herein, by quickly isolating the second portion 106, an auxiliary electrical generator may be added to provide electrical power to the second portion 106.

In an embodiment, the connector 116 is coupled to the switch 114 by a conductor 118. On an opposite side of the connector 116, a conductor 120 connects with a crab joint 122. The crab joint 122 is a commonly used connection arrangement that typically includes a fusable link. A crab joint typically includes a central hub (referred to as the "busbar") with multiple fusible connections (referred to as "limiters") to a number of cables constituting part of the network. The limiters act to protect the cables and other equipment connected to them in case of failure of any of the cables in the network. The opposite side of the crab joint 122 connects with the conductor 104. A conductor 121 connects the switch 114 to the crab joint 122 opposite the conductor 105.

It should be appreciated that the conductor 112 is similarly connected to a switch 124 and a t-type connector 126. The side of the connector 126 opposite the switch 124 is connected by a conductor 128 to the crab joint 122. The crab joint 122 also connects the conductor 128 with the conductor 110. The conductor 111 is electrically connected to the conductor 107 via a switch 121 and a connector 125 that electrically connects the switch 124 with the crab joint 122.

Figure 2:
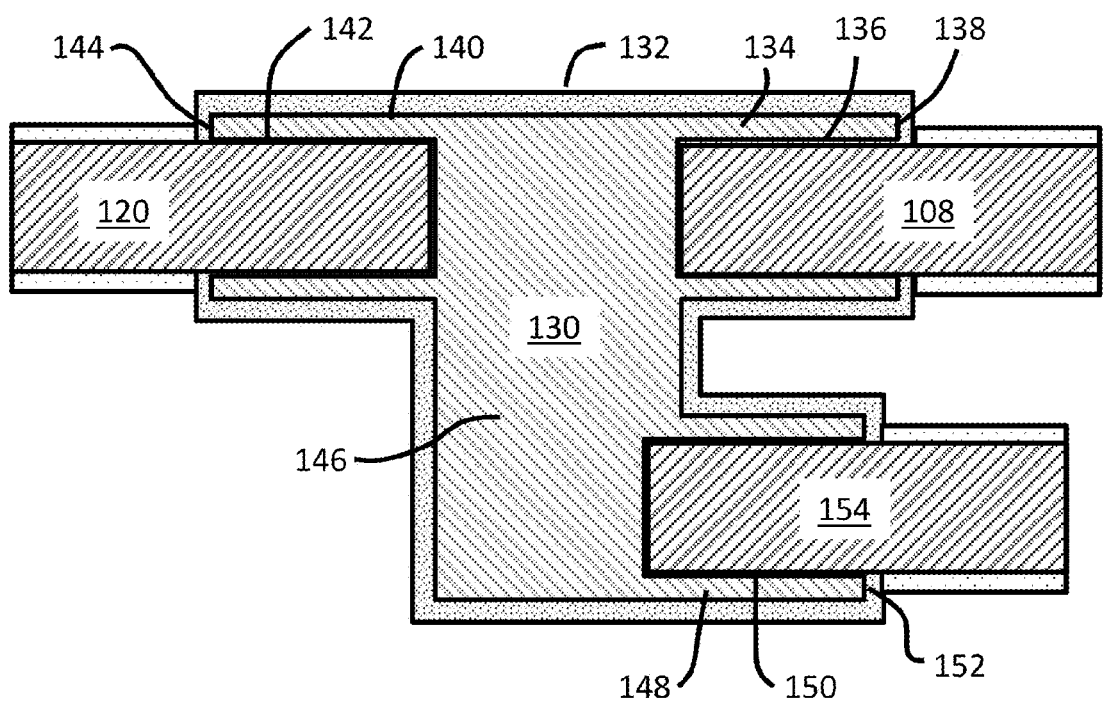
FIG. 2 is a t-type connector for use with the auxiliary generator connection of FIG. 2.

Referring now to FIG. 2, with continuing reference to FIG. 1, an embodiment of the t-type connector 116 is shown. It should be appreciated that while the connector is described herein with respect to the connector 116, this is for exemplary purposes and the connector 126 is constructed in the same manner. In an embodiment, the t-type connector 116 includes a body 130 having an elastomeric outer layer 132. The body 130 may be formed from a single solid electrically conductive material, such as copper for example. The layer 132 encases the body and in an embodiment provides a water-resistant or a water-proof layer over the body 130. In an embodiment, the layer 132 is made from a rubber material.

The body 130 includes first arm 134 having a first opening 136 formed on an end 138. The first opening 136 may be a cylindrical bore that is sized to receive the conductor 108. In an embodiment, the conductor 108 and opening 136 are coupled together via a compression joint. The body 130 further includes a second arm 140 having a second opening 142 formed on an end 144. Similar to the opening 136, the opening 142 may be a cylindrical bore sized to receive the conductor 120. In the exemplary embodiment, the arms 134, 140 are aligned such that the axis of openings 136, 142 are collinear.

The body 130 further includes a third arm 146 that extends perpendicular to the arms 134, 140. A fourth arm 148 extends from the third arm 146. In the exemplary embodiment, the fourth arm 148 extends generally parallel with the first arm 134. However, this is for exemplary purposes and the claimed invention should not be so limited. In other embodiments, the fourth arm 148 may extend on an angle relative to the arms 134, 140, 146. In still further embodiments, the fourth arm 148 may extend parallel with the second arm 140.

The fourth arm 148 includes an opening 150 that extends from an end 152. The opening 150 may be a cylindrical bore that is sized to receive a generator conductor 154. In the exemplary embodiment, the body 130 is configured to operate at 600 V, 600 Amp continuous rating with a 50 KA short circuit rating.

In the exemplary embodiment, the generator conductor 154 is a 500 kCMIL welding cable that has a length of 1-5 feet. The conductor 154 is insulated with a suitable material that allows the cable to be electrically insulated and submersible. On an opposite end of the generator conductor 154 is a generator plug 156. In the exemplary embodiment, the generator plug 156 is a camlock type connector that allows utility personnel to quickly connect an auxiliary electrical generator to the generator conductor 154. It should be appreciated that a second generator conductor 158 having a generator plug 160 is coupled to the connector 126. A third generator conductor 159 having a generator plug 162 is coupled to connector 125.

Figure 3:
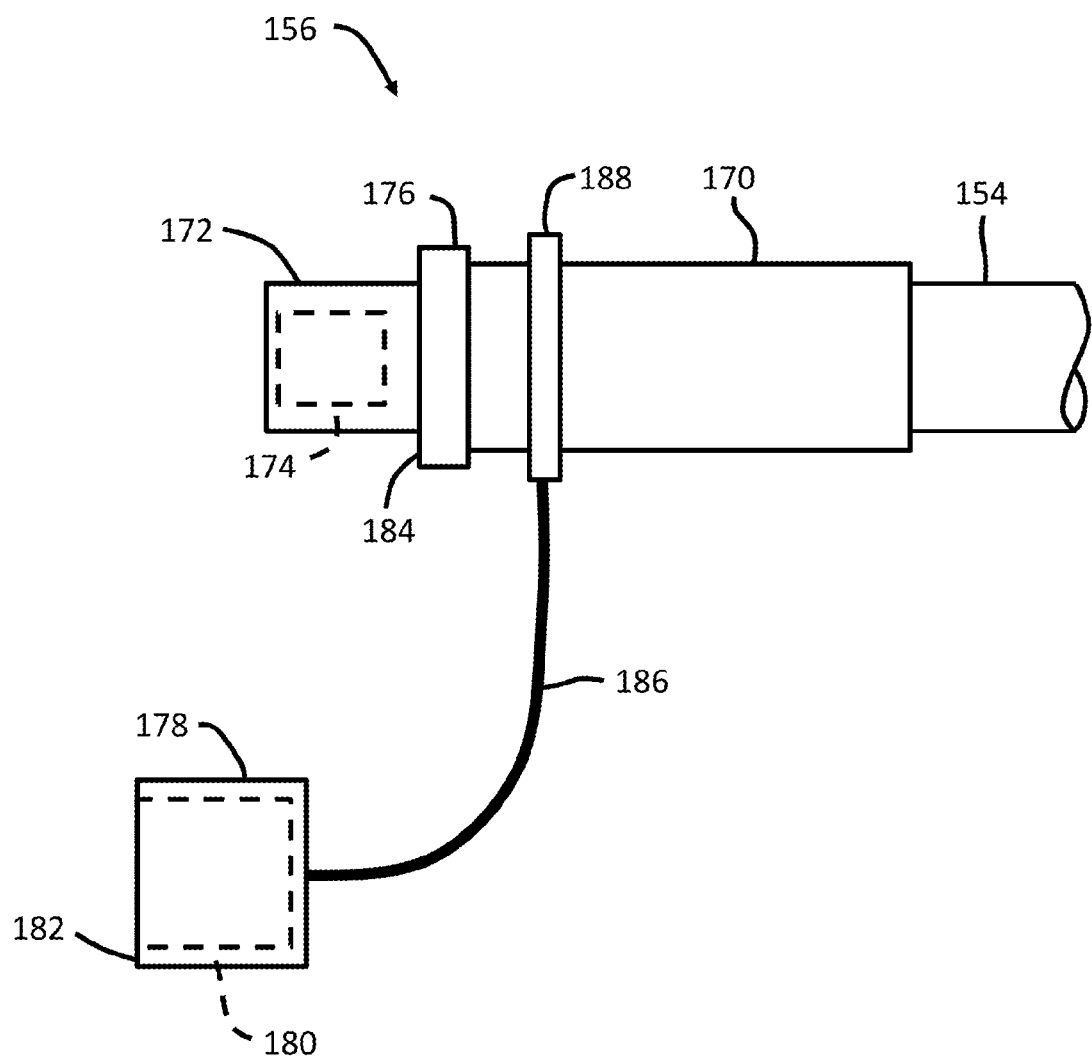
FIG. 3 is a submersible generator plug for use with the auxiliary generator connection of FIG. 1 in accordance with an embodiment of the invention.

In the exemplary embodiment shown in FIG. 3, the generator plugs 156, 160, 162 are configured to be submersible when installed. In an embodiment, the plug 156 includes a body 170 that is coupled to the generator conductor 154, such as with a compression coupling. Opposite the generator conductor 154, the plug 156 has an end 172 that includes a connection means 174, such as a camlock type connector for example, that is configured to couple with a compatible plug (not shown) connected to the auxiliary generator. In an embodiment, the body 170 includes a shoulder 176 at the transition between the body 170 and the end 172.

In an embodiment, the plug 156 is configured to be submersible. To seal the end of the plug 156, a cap member 178 is provided that has an opening 180 that has a diameter sized to be received on the end 172 as a press-fit. In an embodiment, the end surface 182 engages a side surface 184 of the shoulder 176 when the cap 178 is installed on the end 172. The cap 178 cooperates with the end 172 to prevent water from migrating to the connection means 174. In an embodiment, the cap 178 is coupled to a cable or tether 186. In an embodiment, the opposite end of the tether 186 is coupled to a collar 188 that is slidably coupled to the body 170. In an embodiment, the collar 188, the tether 186 and the cap 178 are formed from a unitary or single piece of material.

During normal operation, the switches 114, 124 are configured to flow electrical power from the second portion 106 to the first portion 102. In this configuration the generator plugs 156, 160 are disconnected from the auxiliary electrical generator. When the electrical utility desires to power the first portion 102 from the auxiliary electrical generator instead of from the main distribution system, the utility personnel first access the system 100, such as via a manhole cover for example. The switches 114, 124 are actuated and the first portion 102 is isolated from the second portion 106 and electrical power is removed from the secondary distribution network. Cables with a plug compatible with the generator plugs 156, 160 are connected between the auxiliary electrical generator and the generator conductors 154, 158. The auxiliary electrical generator is activated and electrical power flows to the first portion 102 via the connectors 116, 126 to allow the auxiliary electrical generator to pick up the load of the secondary distribution network. When normal operations are desired, the process is performed in reverse.

Figure 4:
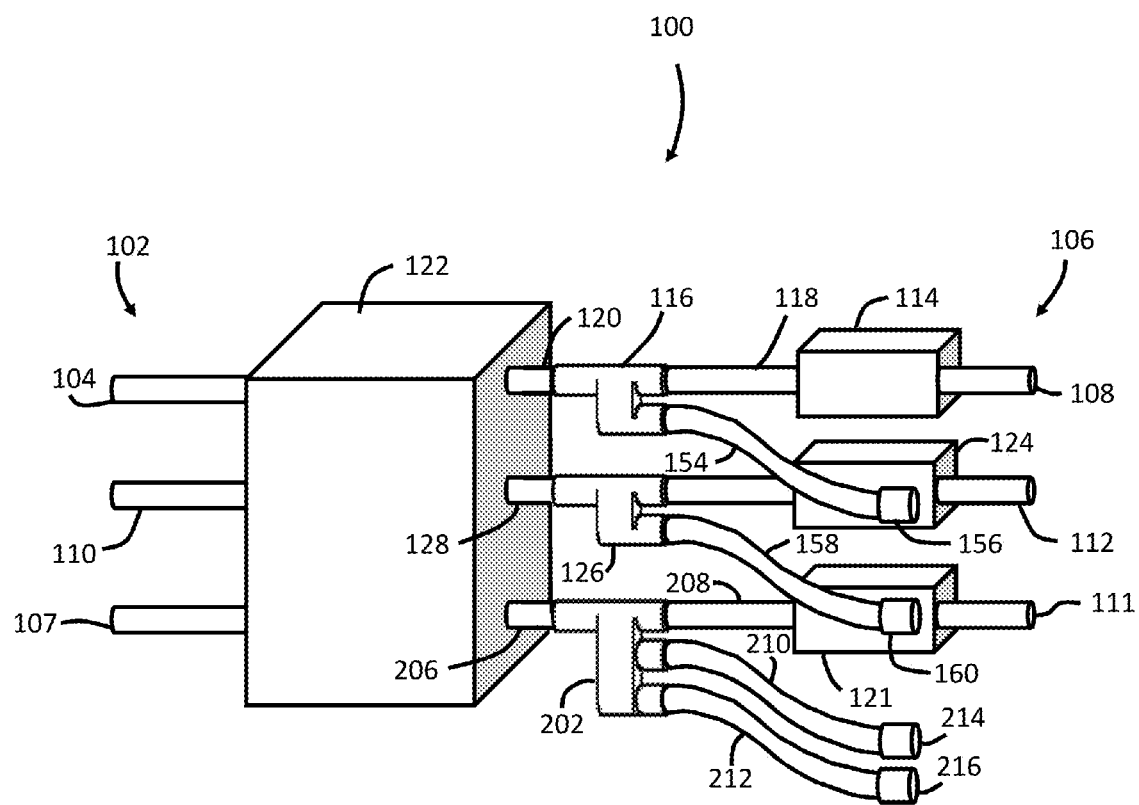
FIG. 4 is a perspective view of an auxiliary generator connection in accordance with another embodiment of the invention.
Figure 5:
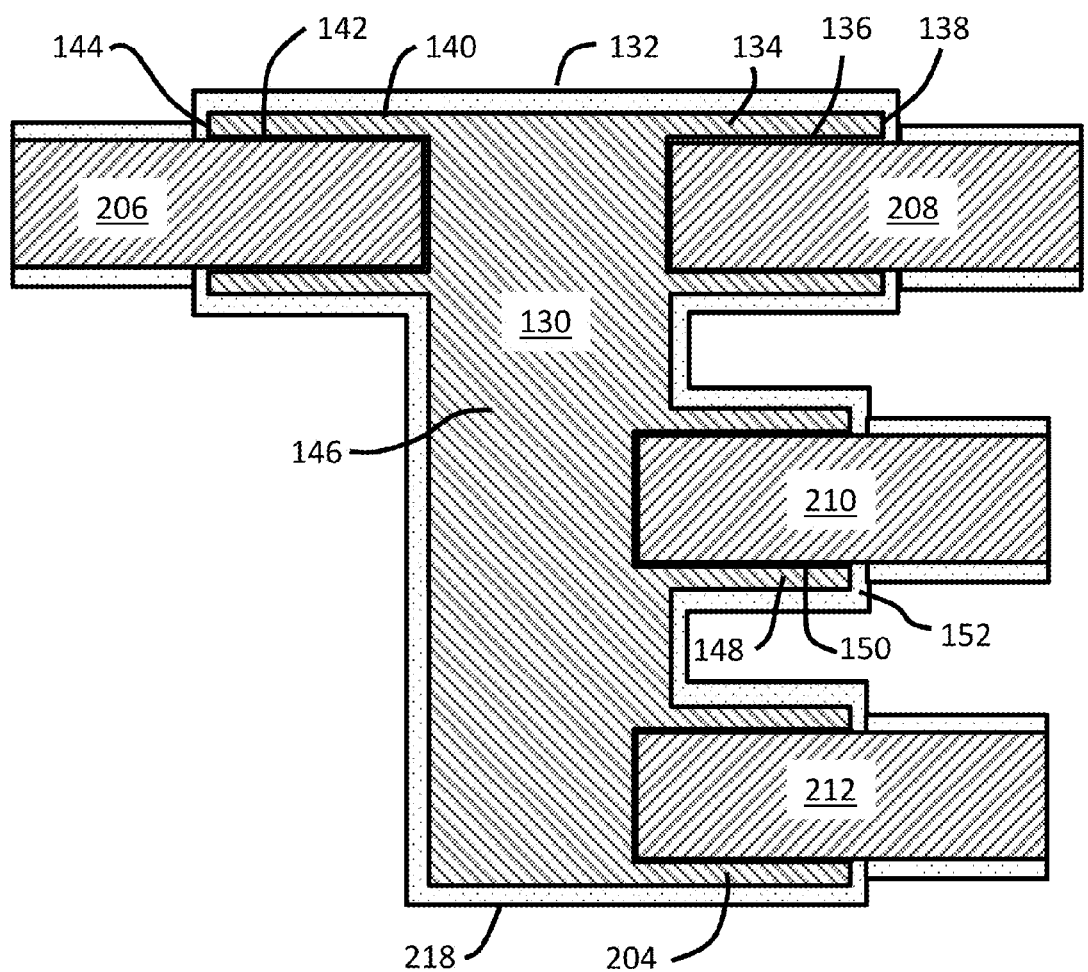
FIG. 5 is a t-type connector for use with the auxiliary generator connection of FIG. 2.

Referring now to FIG. 4 and FIG. 5, another embodiment is shown of a generator connection system 200. The components of system 200 that are identical to those of system 100 will not be repeated here for brevity. The system 200 is similar to system 100, except that connector 202 includes a fifth arm 204 that extends generally parallel to the fourth arm 148. It should be appreciated that the arrangement illustrated in FIG. 5 with the arms 148, 204 extending from the same side as third arm 146 is for exemplary purposes and the claims should not be so limited. In other embodiments, the arms 148, 204 may be disposed on opposing sides of third arm 146. In still other embodiments, the fifth arm 204 may extend from an end 218 of the body 130 opposite the conductors 206, 208. Further one or more of the arms 148, 204 may extend on an angle relative to the conductors 206, 208. In still further embodiments, the arms 148, 204 may extend from the end 218 in a Y-configuration. In an embodiment, the connector 202 has a 30 kV, 600 amp continuous rating with a 50 KA peak short circuit rating.

The arms 148, 204 are connected to generator conductors 210, 212 for connecting to an electrical generator. In an embodiment, the generator conductor 210, 212 may be smaller or lower capacity than the embodiment using a single conductor, such as conductor 154 for example. In an embodiment, the conductors 210, 212 are made from a 250-350 kCMIL welding cable that has a length of 1-5 feet. In still other embodiments, the conductors 210, 212 are made from 500 kCMIL welding cable. Each conductor 210, 212 has a generator plug 214, 216 connected to an end opposite the connector 202. In the exemplary embodiment, the generator plugs 214, 216 are camlock type connectors that allow utility personnel to quickly connect an auxiliary electrical generator to the generator conductors 210, 212. It should be appreciated that while the embodiment of FIG. 4 illustrates the connectors 116, 126 as having a single generator conductor coupled thereto. It should be appreciated that the connectors 116, 126 may also be configured in the same manner as connector 202 with two generator conductors. Further, the plugs 214, 216 may be configured in the same manner as illustrated in FIG. 3 with a cap member 178 that prevents or reduces the risk of water migration into the plug.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An auxiliary generator connection for an electrical utility distribution network, the connection comprising:
   at least one first conductor coupled to a first portion of the electrical utility distribution network;
   at least one second conductor coupled to a second portion of the electrical utility distribution network;
   a t-type connector coupled between the at least one first conductor and the at least one second conductor;
   a switch coupled between the at least one second conductor and the t-type connector;
   a generator conductor electrically coupled at a first end to the t-type connector; and
   a generator plug coupled to a second end of the generator conductor opposite the t-type connector.

2. The connection of claim 1, wherein the t-type connector includes a body and an elastomeric submersible outer layer.

3. The connection of claim 2 wherein the generator conductor is a 500 kCMIL welding cable having a length of 1 foot to 5 feet.

4. The connection of claim 3 wherein the generator plug is a camlock type generator plug.

5. The connection of claim 4 wherein the elastomeric outer layer is made from rubber.

6. The connection of claim 4 wherein the t-type connector is configured to operate at 120V, 600 amp continuous rating with a 50 KA peak short circuit rating.

7. The connection of claim 1 further comprising a crab joint coupled to the at least one first conductor.

8. The connection of claim 1 further comprising a cap member operably coupled to the generator plug, wherein the generator plug is configured to be submersible when the cap is installed on generator cam lock device which is attached to the plug.

9. A method of connecting an auxiliary electrical generator to an electrical utility distribution network, the method comprising:
   providing a t-type connection between a first conductor coupled to a first portion of the electrical utility distribution network and a second conductor coupled to a second portion of the electrical utility distribution network;
   providing a generator cable coupled on a first end to the t-type connector and generator plug on a second opposing end of the generator cable;
   providing a switch between the t-type connector and the second conductor;
   actuating the switch to isolate the first portion of the electrical utility distribution network from the second portion of the electrical utility distribution network;
   coupling the generator plug to an auxiliary electrical generator; and
   generating electrical power with the auxiliary electrical generator.

10. The method of claim 9 wherein the t-type connector includes a body and an elastomeric outer layer.

11. The method of claim 10 wherein the elastomeric outer layer is made from rubber.

12. The method of claim 10 wherein the generator plug is a cam lock type plug.

13. The method of claim 12 wherein the t-type connector is configured to operate at 30 kV, 600 amp continuous rating with a 50 KA peak short circuit rating.

14. The method of claim 13 wherein the generator conductor is a 500 kCMIL welding cable having a length of 1 foot to 5 feet.

15. The method of claim 9 further comprising providing a crab joint coupled to the at least one first conductor.

16. The method of claim 9 further comprising installing a cap on generator plug to form a water tight seal.

17. A system for connecting an auxiliary electrical generator to an electrical utility distribution network, the system comprising:
   a crab joint configured to electrically couple to a first portion of the electrical utility distribution network;
   a t-type connector electrically coupled to the crab joint, the t-type connector being configured to operate at 30 kV, 600 amp continuous rating with a 50 KA peak short circuit rating;
   a switch electrically coupled to the t-type connector opposite the crab joint, the switch configured to electrically couple to a second portion of the electrical utility distribution network;
   a first generator conductor electrically coupled on a end to a first arm of the t-type connector;
   a second generator conductor electrically coupled on an end to a second arm of the t-type connector;
   a first generator plug coupled to the first generator conductor on an end opposite the t-type connector; and
   a second generator plug coupled to the second generator conductor on an end opposite the t-type connector.

18. The system of claim 17 wherein the t-type connector includes a copper body and a rubber outer layer.

19. The system of claim 18 wherein the first generator conductor and the second generator conductor are a 500 kCMIL welding cable having a length of 1 foot to 5 feet.

20. The connection of claim 19 further comprising a cap operably coupled to the first generator plug, wherein the first generator plug and the cap cooperate to form a water tight seal of the first generator plug when the cap is installed on cam lock device which is attached to the first generator plug.

* * * * *